United States Patent
Ebsen et al.

(10) Patent No.: US 10,423,500 B2
(45) Date of Patent: Sep. 24, 2019

(54) TECHNOLOGIES FOR LIMITING PERFORMANCE VARIATION IN A STORAGE DEVICE

(71) Applicant: SEAGATE TECHNOLOGY LLC, Cupertino, CA (US)

(72) Inventors: David S. Ebsen, Minnetonka, MN (US); Kevin A. Gomez, Eden Prairie, MN (US); Mark Ish, Castro Valley, CA (US); Daniel J. Benjamin, Savage, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 116 days.

(21) Appl. No.: 15/170,709

(22) Filed: Jun. 1, 2016

(65) Prior Publication Data

US 2017/0351582 A1 Dec. 7, 2017

(51) Int. Cl.
*G06F 11/00* (2006.01)
*G06F 11/14* (2006.01)
*G06F 11/10* (2006.01)

(52) U.S. Cl.
CPC ...... *G06F 11/1471* (2013.01); *G06F 11/1008* (2013.01); *G06F 11/1435* (2013.01)

(58) Field of Classification Search
CPC ............................ G06F 11/1471; G06F 11/008
See application file for complete search history.

(56) References Cited

U.S. PATENT DOCUMENTS

| | | | | |
|---|---|---|---|---|
| 5,471,631 A * | 11/1995 | Beardsley | ........... | G06F 11/0745 702/178 |
| 5,712,976 A * | 1/1998 | Falcon, Jr. | ............ | G06F 3/0601 348/E5.008 |
| 6,338,151 B1 * | 1/2002 | Yudenfriend | ......... | G06F 11/076 714/15 |
| 6,915,386 B2 * | 7/2005 | Doyle | ................ | G06F 12/0804 370/351 |
| 6,959,344 B2 * | 10/2005 | Murotani | ............ | G06F 11/0727 710/15 |
| 7,240,115 B2 * | 7/2007 | Chase | ..................... | H04L 29/06 709/225 |
| 7,596,657 B2 * | 9/2009 | Kaler | .................... | G06F 3/0608 711/103 |
| 7,831,682 B2 * | 11/2010 | Certain | ............... | G06F 11/1451 707/639 |
| 7,913,051 B1 * | 3/2011 | Todd | ................. | G06F 17/30097 711/108 |
| 7,949,799 B2 * | 5/2011 | Thielo | .................. | G06F 11/004 700/286 |

(Continued)

FOREIGN PATENT DOCUMENTS

CN 103092526 A 5/2013

*Primary Examiner* — Christopher S McCarthy
(74) *Attorney, Agent, or Firm* — Holland & Hart LLP

(57) ABSTRACT

Systems and methods for limiting performance variation in a storage device are described. Storage devices receive work requests to perform one or more operations from other computing devices, such as a host computing device. Completing the work requests may take a response time. In some embodiments, if the response time of executing the work request exceeds a threshold, the storage device may assign additional computing resources to complete the work request.

20 Claims, 5 Drawing Sheets

(56) References Cited

U.S. PATENT DOCUMENTS

| | | | |
|---|---|---|---|
| 8,683,587 B2* | 3/2014 | Hunt | G06F 11/3495 |
| | | | 709/223 |
| 8,688,949 B2* | 4/2014 | Resch | G06F 17/30091 |
| | | | 711/100 |
| 8,769,186 B2* | 7/2014 | Garman | G06F 11/1448 |
| | | | 711/100 |
| 8,819,328 B2 | 8/2014 | Lassa et al. | |
| 8,862,845 B2* | 10/2014 | Lary | G06F 3/061 |
| | | | 711/103 |
| 8,914,571 B2* | 12/2014 | Lee | G06F 13/16 |
| | | | 711/103 |
| 8,914,609 B2* | 12/2014 | Resch | G06F 17/30091 |
| | | | 711/100 |
| 9,032,175 B2 | 5/2015 | Gao et al. | |
| 9,244,766 B2* | 1/2016 | Patapoutian | G06F 11/1048 |
| 9,280,296 B2* | 3/2016 | Crawford | G06F 3/065 |
| 9,411,834 B2* | 8/2016 | Hrischuk | G06F 17/30289 |
| 9,448,920 B2* | 9/2016 | Erdmann | G06F 12/0284 |
| 9,547,445 B2* | 1/2017 | Faulkner | G06F 3/0611 |
| 9,590,879 B2* | 3/2017 | Wray | H04L 43/08 |
| 9,659,041 B2* | 5/2017 | Sambamurthy | G06F 17/30309 |
| 9,766,965 B2* | 9/2017 | Waheed | G06F 11/0772 |
| 9,778,853 B1* | 10/2017 | Gaikwad | G06F 3/0611 |
| 9,785,562 B2* | 10/2017 | Liu | G06F 12/0871 |
| 2014/0372607 A1* | 12/2014 | Gladwin | H04L 67/16 |
| | | | 709/224 |
| 2019/0132256 A1* | 5/2019 | Wada | G06N 20/00 |

\* cited by examiner

TECHNOLOGIES FOR LIMITING PERFORMANCE VARIATION IN A STORAGE DEVICE

SUMMARY

The present disclosure is directed to methods and systems for limiting performance variation in a storage device. In some embodiments, the present systems and methods may allocate additional resources to execute work requests received by the storage device.

A storage device including systems for limiting performance variation in the storage device is described. In one embodiment, the storage device may include a controller configured to receive a request to perform one or more operations, estimate a response time of the request, the response time being indicative of a duration taken by the controller to partially execute the request, determine that the response time exceeds an execution time threshold, and assign additional resources to execute one or more error recovery operations upon determining that the response time exceeds the execution time threshold.

The controller of the storage device may be configured to determine an arrival time of the request, the arrival time being a time at which the controller received the request. The controller may time-stamp the request with the arrival time or may log the arrival time of the request in an arrival log. The controller may be configured to compare a current time to the arrival time and determine the response time based on a difference between the current time and the arrival time. The controller may be further configured to determine that an error has occurred during execution of the one or more operations included in the request, and execute the one or more error recovery operations to compensate for the error that has been detected. The one or more operations of the request may include a mixed work load of both read operations and write operations. The execution time threshold may be equal to an average execution time to perform the request. The controller may be configured to assign the one or more error recovery operations to have a highest priority for resources of the storage device. The storage device may be a solid state drive (SSD) storage device. The one or more error recovery operations may include re-reading one or more memory cells of the storage device. The one or more error recovery operations may include an outer code recovery operation.

A method for limiting performance variation in a storage device is also described. In one embodiment, the method may include receiving, by a controller of the storage device, a request to perform one or more operations, estimating a response time of the request, the response time being indicative of a duration taken by the controller to partially execute the request, determining that the response time exceeds an execution time threshold, and assigning additional resources to execute one or more error recovery operations upon determining that the response time exceeds the execution time threshold.

An apparatus for limiting performance variation in a storage device is also described. In one embodiment, the apparatus may include a processor, memory in electronic communication with the processor, and instructions stored in the memory. The instructions are executable by the processor to perform the steps of receiving, by a controller of the storage device, a request to perform one or more operations, estimating a response time of the request, the response time being indicative of a duration taken by the controller to partially execute the request, determining that the response time exceeds an execution time threshold, and assigning additional resources to execute one or more error recovery operations upon determining that the response time exceeds the execution time threshold.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein-including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label.

DETAILED DESCRIPTION

Figure 1:
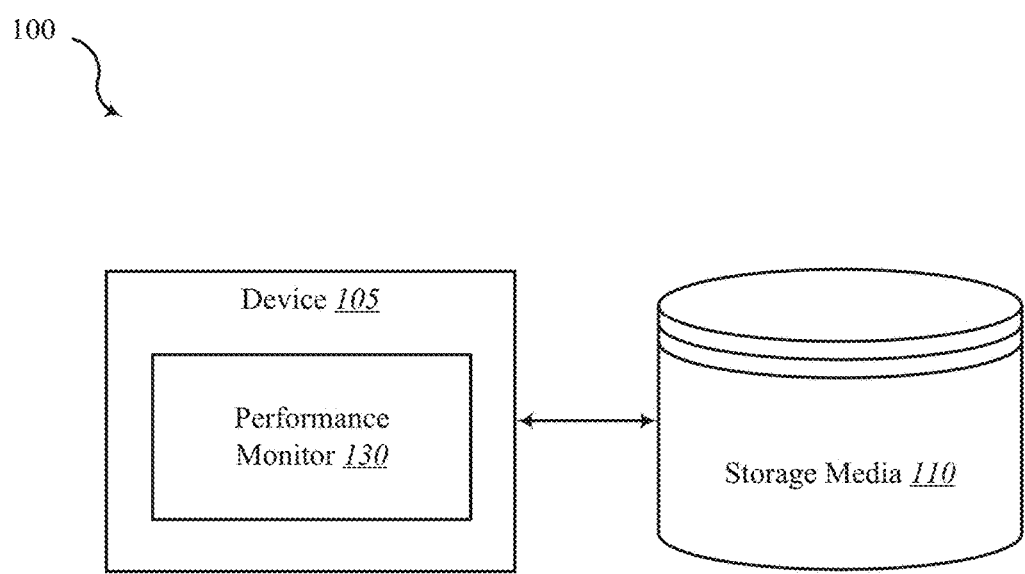
FIG. 1 is a block diagram of an example of a system for limiting performance in a computing device in accordance with various embodiments.

The following relates generally to limiting performance variation in a storage device. In an embodiment, storage devices are frequently asked to provide consistent performance. For example, large data centers want to be able to tell their customers that they can store/deliver data within specific and narrow time frames. As such, storage devices designers examine variations in response time and typically try to eliminate response time outliers.

In addition, users of storage devices also want their storage devices to not introduce any errors into the data being stored. Storage devices may introduce errors into data through a variety of ways. For example, solid state drives (SSDs) using Multi Level Cell (MLC) technology may introduce read or write errors into the data by incorrectly interpreting charge levels. MLC SSDs are designed to store two bits of data in a single cell. Consequently, each cell of a MLC SSD is capable of exhibiting four states, which represent different amounts of charge stored in a floating gate. Because MLC SSDs must distinguish between four charge levels (instead of the typical two charge levels found in a single level cell (SLC) SSD), the distinctions between the various charge levels may be less explicit. As such, it is more likely that an MLC SSD than a SLC SSD will incorrectly misinterpret the charge level of cell and thereby produce incorrect data.

To overcome errors, a typical storage device system may employ various method of error recovery. For example, if the storage device detects that an error may be present in the data, the storage device may implement a re-read command to correct for the error. Implementing error recovery operations, while improving the quality of the data being produced, may induce variation in the response time of fulfilling a request. Hence, there may be a trade-off between accuracy of the data and the speed of delivery of the data. Furthermore, the rate at which error recovery operations are used by an storage device is frequently system dependent. At some points in the life cycle of a storage device, error recovery operations may be invoked at a rate of about one out of every one hundred work requests.

The systems and methods described in more detail below are configured to reduce the variation in response times due to the use of error recovery operations. In an embodiment, the systems and methods described herein are configured to reduce the response time for the requests that take the longest to perform.

In some embodiments, the storage device may monitor the response time of each request received by the storage device. When the response time of a work request has exceeded an execution threshold, the storage device will allocate additional computing resources to executing the work request. In some embodiments, the response time exceeds the execution threshold because error recovery operations are being used to correct errors in the data. In such embodiments, the storage device will allocate additional resources to perform the error recovery operations. By prioritizing the error recovery operations above other work requests, actions, and operations being performed by the storage device, the response times for the work requests that are outliers are reduced and response times are effectively pulled toward the average response time for work requests. In addition, allocating additional resources to work requests with too long of a response time may cause other requests to have slightly longer response times because not as many resources are available to execute the work requests. The result of these systems and methods is that variations in response time for executing a work request are minimized.

FIG. 1 is a block diagram illustrating one embodiment of a system 100 for implementing the methods described herein. The system 100 may include a device 105 and storage media 110. The storage media 110 may include any combination of hard disk drives, solid state drives, and hybrid drives that include both hard disk and solid state drives. In some embodiments, the systems and methods described herein may be performed on a single device (e.g., device 105). In some cases, the methods described herein may be performed on multiple storage devices or a network of storage devices. Examples of the device 105 include a storage server, a storage enclosure, a storage controller, storage drives in a distributed storage system, storage drives on a cloud storage system, storage devices on personal computing devices, storage devices on a server, etc. In some configurations, the device 105 may include a performance monitor 130. In one example, the device 105 may be coupled to the storage media 110. In some embodiments, the device 105 and the storage media 110 may be components of flash memory or a solid state drive. Alternatively, the device 105 may be a component of a host (e.g., operating system, host hardware system, etc.) of the storage media 110.

In one embodiment, the device 105 may be a computing device with one or more processors, memory, and/or one or more storage devices. In some cases, the device 105 may communicate with the storage media 110 using a wired or wireless connection. In some embodiments, the device 105 may include a cloud drive for a home or office setting. In one embodiment, the device 105 may include a network device such as a switch, router, access point, etc. In one example, the device 105 may be operable to receive data streams, store and/or process data, and/or transmit data from, to, or in conjunction with one or more local and/or remote computing devices.

The device 105 may include a database. In some cases, the database may be internal to the device 105. For example, the storage media 110 may include a database. Additionally, or alternatively, the database may include a wired and/or a wireless connection to the database. Additionally, as described in further detail herein, software and/or firmware (e.g., stored in memory) may be executed on a processor of the device 105. Such software and/or firmware executed on the processor may be operable to cause the device 105 to monitor, process, summarize, present, and/or send a signal associated with the operations described herein.

In some embodiments, the storage media 110 may connect to the device 105 via one or more networks. Examples of networks include cloud networks, local area networks (LAN), wide area networks (WAN), virtual private networks (VPN), a personal area network, near-field communication (NFC), a telecommunications network, wireless networks (using 802.11, for example), and/or cellular networks (using 3G and/or LTE, for example), etc. In some configurations, the network may include the Internet and/or an intranet. The device 105 may receive and/or send signals over a network via a wired communication link, wireless communication link, or any combination of the two. In some embodiments, a user may access the functions of the device 105 via a local computing device, a remote computing device, and/or a network device. For example, in some embodiments, the device 105 may include an application that interfaces with a user. In some cases, the device 105 may include an application that interfaces with one or more functions of a network device, a remote computing device, and/or a local computing device.

In one embodiment, the storage media 110 may be internal to the device 105. As one example, the device 105 may include a storage controller that interfaces with storage media of the storage media 110. The performance monitor 130 may assign additional resources to execute a pending request based at least in part on determining that the response time of the pending request has exceeded an execution time threshold.

Figure 2:
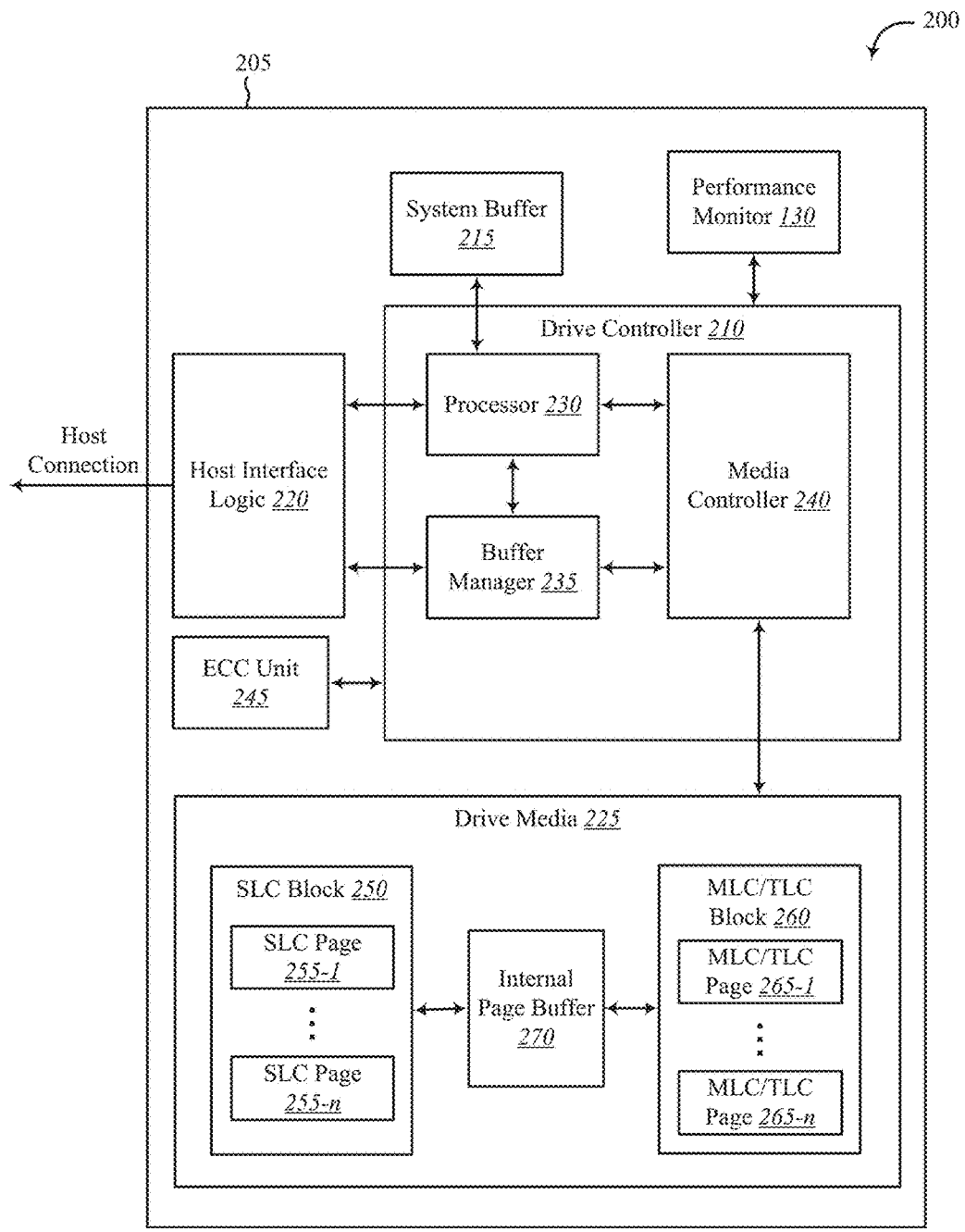
FIG. 2 shows a simplified block diagram of an embodiment of the system of FIG. 1 in accordance with various aspects of this disclosure.

FIG. 2 shows a block diagram 200 of an embodiment of a storage device 205 for use in electronic storage of data, in accordance with various aspects of this disclosure. The storage device 205 may be an example of one or more aspects of the system 100 described with reference to FIG. 1. The storage device 205 may be an example of the device 105, the storage media 110, or a combination of the two. In some embodiments, the storage device 205 may be embodied as an SSD storage device for storing data. The storage device 205 may include a drive controller 210, a drive buffer 215, a host interface logic 220, a drive media 225, an error control unit 245 (ECC unit 245), and a performance monitor 130. Each of these components may be in communication with each other and/or other components directly and/or indirectly through the one or more networks.

One or more of the components of the storage device 205, individually or collectively, may be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented—in whole or in part—with instructions embodied in memory formatted to be executed by one or more general and/or application-specific processors.

In one embodiment, the drive controller 210 may include a processor 230, a buffer manager 235, and a media controller 240. The drive controller 210 may process, via the processor 230, read and write requests in conjunction with the host interface logic 220, the interface between the storage device 205 and the host of the storage device 205 (e.g., an operating system, host hardware system, etc.). The drive buffer 215 may hold data temporarily for internal operations of the storage device 205. For example, a host may send data to the storage device 205 with a request to store the data on the drive media 225. The drive controller 210 may process the request and store the received data in the drive media 225. In some cases, a portion of data stored in the drive media 225 may be copied to the drive buffer 215 and the processor 230 may process or modify this copy of data and/or perform an operation in relation to this copy of data held temporarily in the drive buffer 215. When processing a request, the drive controller 210 may communicate with the ECC unit 245 to detect and correct any errors that may be present in the data. The ECC unit 245 is configured to detect errors present in the data being stored or retrieved from the storage device 205 and to implement error recovery operations to restore the data to its proper value(s).

Although depicted outside of drive controller 210, in some embodiments, performance monitor 130 may include software, firmware, and/or hardware located within drive controller 210. For example, performance monitor 130 may include at least a portion of the processor 230, the buffer manager 235, and/or the media controller 240. In one example, the performance monitor 130 may include one or more instructions configured to be executed by the processor 230, the buffer manager 235, and/or the media controller 240. The performance monitor 130 may be configured to assign additional resources to execute a pending work request based at least in part on determining that the response time of the pending work request has exceeded an execution time threshold.

In the illustrative embodiment, the drive media 225 may comprise any type of NAND cell technology used in an SSD storage device. In some embodiments, the drive media 225 may comprise SLC NAND technology, MLC NAND technology, tri-level cell (TLC) NAND technology, any combination of the various NAND technologies, or even other levels of cell NAND technology (e.g., 4, 5, 6, etc.). As shown in FIG. 2, the drive media 225 illustratively includes an SLC block 250, an MLC or TLC block 260, and an internal page buffer 270. The SLC block 250 includes any number of SLC pages 255-1 to 255-n. The MLC/TLC block 260 includes any number of MLC or TLC pages 265-1 to 265-n.

Figure 3:
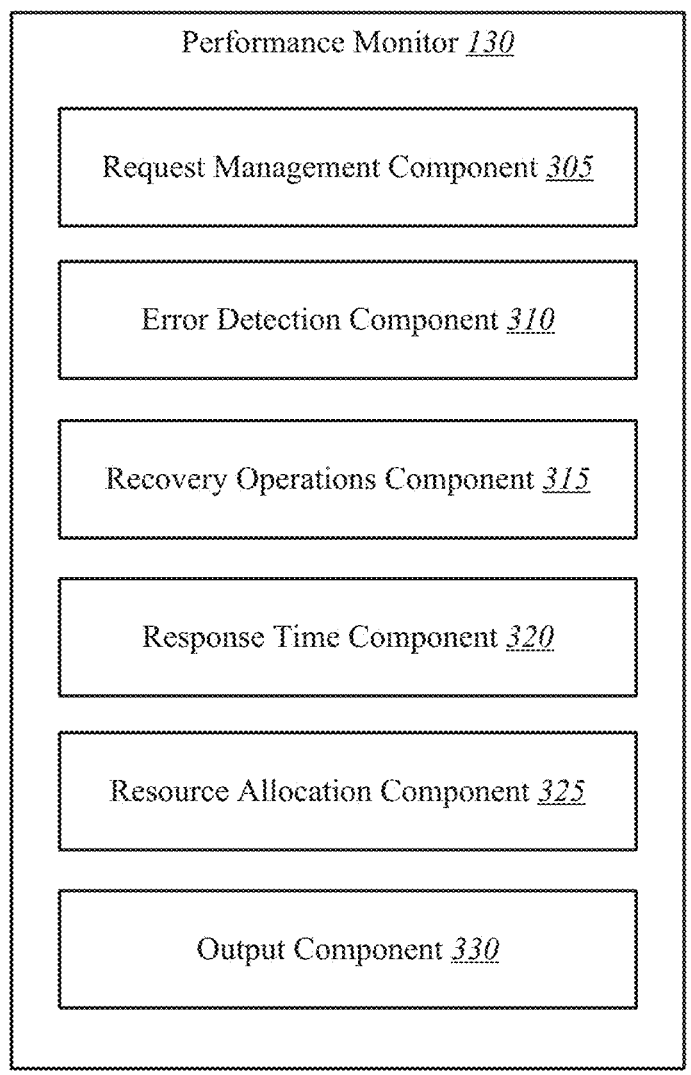
FIG. 3 shows a simplified block diagram of one or more software components in accordance with various aspects of this disclosure.

FIG. 3 shows a block diagram of an environment 300 created by the performance monitor 130 on the system 100. The environment 300 may be implemented using one or more processors, memory, and/or one or more storage devices. The performance monitor 130 may include a request management component 305, an error detection component 310, a recovery operations component 315, a response time component 320, a resource allocation component 325, and an output component 330. The performance monitor 130 may be one example of performance monitor 130 of FIG. 1 and/or FIG. 2. The components of the performance monitor 130 may be configured to perform any of the functions described in relation to the method 600 described in more detail below.

The request management component 305 is configured to receive work requests from one or more other computing devices (e.g., a host computing device). Upon receipt of a work request, the request management component 305 may be configured to determine an arrival time of the work request. The arrival time of each work request may be tracked as part of determining the response times and the total response times of the work requests.

The request management component 305 may be configured to also mediate between multiple work requests vying for limited available computing resources. At times, the request management component 305 may receive more work requests than can be completed immediately. In such a situation, the request management component 305 may have to determine which work requests to execute and complete first and which work requests can wait till a later time to be executed and completed.

The error detection component 310 is configured to determine whether an error has occurred while executing one or more operations included in the work request. During the execution of a work request, errors or failures will occur at some probability. The error detection component 310 may be configured to execute a number of error detection algorithms to determine if an error occurs either in the underlying data that is the subject of the work request, or during the execution of the operation itself.

The recovery operations component 315 is configured to execute one or more error recovery operations to compensate for an error that has been detected. The specific error recovery operations implemented by the recovery operations component 315 may depend on the type of error detected.

The response time component 320 is configured to estimate and/or determine a response time of the work requests being received by the performance monitor 130. In some embodiments, estimating the response time of a particular work request may include comparing a current time to the arrival time of the particular work request and determining the response time based at least in part on the difference between the current time and the arrival time. In other embodiments, other estimation techniques may be used to determine the response times of work requests.

The response time component 320 is also configured to determine whether the response time exceeds an execution time threshold. This is done by comparing the response time against the execution time threshold. In some embodiments, the execution time threshold is equal to an average execution time to perform a work request. In other embodiments, the execution time threshold may be set and/or modified by a user through a user input.

The resource allocation component 325 is configured to assign additional computing resources to completing a work request in response to determining that the response time of the work request exceeds the execution time threshold. In some embodiments, the resource allocation component 325 may assign additional computing resources to execute the work requests and put other processes on hold. In other embodiments, the resource allocation component 325 may assign additional resources to execute one or more error recovery operations being performed by the performance monitor 130.

The output component 330 is configured to determine whether the work request has been completed. If the work request has been completed, the output component is configured to output the results of the completed work request to the originator of the work request (e.g., a host computing device). In some embodiments, the output component 330 is configured to determine a completion time of the work request. The output component 330 may determine the total response time by taking the difference of the completion time and the arrival time.

Figure 4:
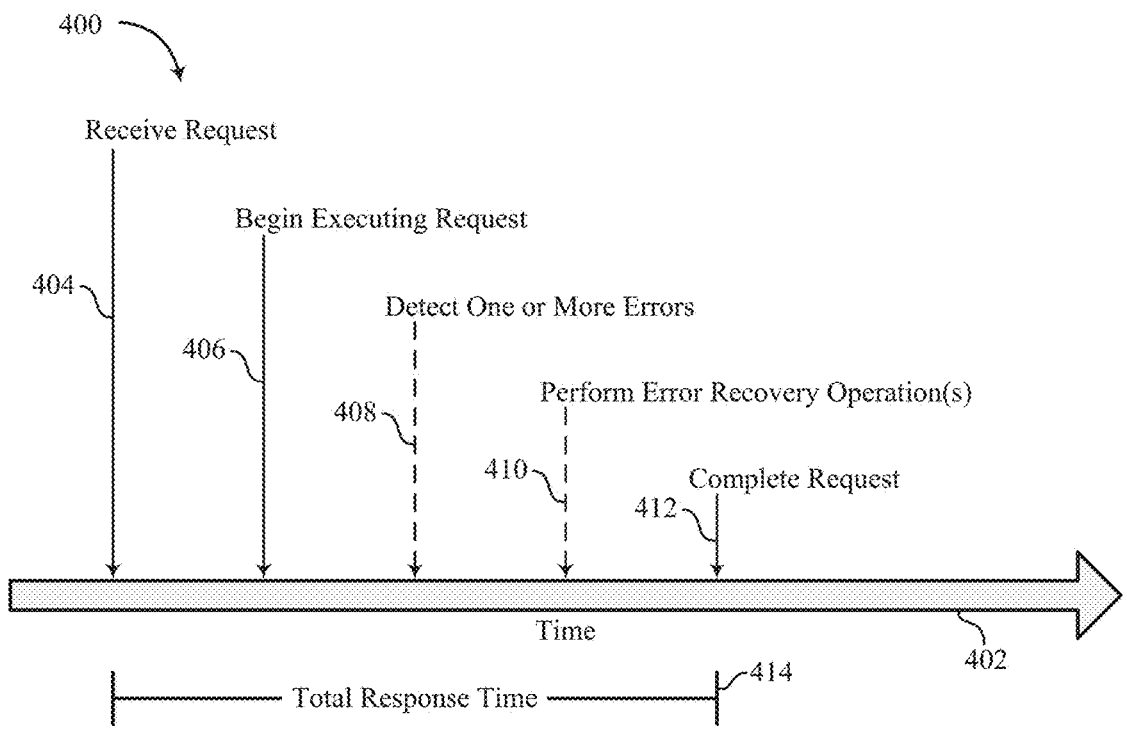
FIG. 4 shows a simplified graphical representation of an illustrative process of executing a work request in accordance with various aspects of this disclosure.

FIG. 4 shows a graphical representation of an illustrative process 400 of executing a work request in accordance with various aspects of this disclosure. At least one aspect of the process 400 may be implemented in conjunction with the system 100 of FIG. 1, the storage device 205 of FIG. 2, and/or performance monitor 130 depicted in FIGS. 1, 2, and 3. The process 400 is depicted as happening along a timeline 402. While the various steps of FIG. 4 are depicted as occurring at specific times along the timeline 402, it should be understood that the exact and relative times of the occurrences of each step may be different than what is shown, including different orders, additional steps not shown, and shorter and longer time periods to fulfill any given step.

At step 404, the system 100 receives a work request. As used in this application, a work request may include any command received from a host device to perform any function the system 100 is capable of performing. For example, a work request may include a request to write data to the storage media 110 or to read data from the storage media 110. Typically, the system 100 will have some process for handling multiple requests at once. For example, the system 100 may execute work requests on a first in, first out (FIFO) basis, or the system 100 may execute work requests on a priority basis where different work requests get different priorities based on a number of factors.

Once the system 100 determines that the work request is ready to be executed, at step 406, the system 100 will begin executing the work request. During the execution of the work request, the system 100 may, at step 408, determine that one or more errors are present. These errors may include errors in the data being written to the storage media 110, the data being read from the storage media 110, or may include other errors that may occur during the execution of the work request. If the errors that are detected are of a certain type, at step 410, the system 100 may perform one or more error recovery operations to correct for the identified errors. As used in this application, an error recovery operation may include any process or operation that is capable of verifying or determining the correct values for any type of data. In some embodiments, step 408 or step 410 may or may not be performed by the system 100.

Once any error recovery operations are complete, at step 412, the system 100 completes the work request and outputs the requested results of the work request. The time from receiving the work request (step 404) to completing the work request (step 412) is the total response time 414 of the work request. As used in this application, a response time indicates a time period to partially execute the work request. Meaning, a response time begins at receipt of the particular work request and may represent any of a number of time periods before the work request is completed at step 412. For example, a response time of a work request may indicate the time period between receipt of the work request (step 404) and when the system began executing the work request (step 406); or a response time may indicate the time period between beginning to execute the work request (step 406) and beginning to execute error recovery operations (step 410). A response of a particular work request, by definition, is less than the total response time 414 of the particular work request.

Figure 5:
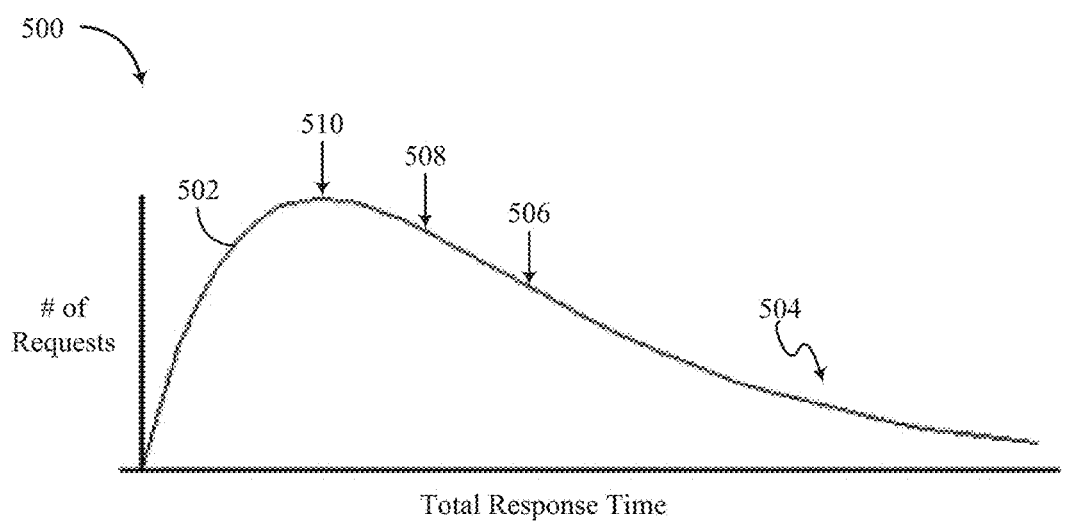
FIG. 5 shows a simplified graphical representation of a distribution of total response times for executing work requests in accordance with various aspects of this disclosure.

FIG. 5 shows a graphical representation 500 of a distribution 502 of total response times 414 for executing work requests in accordance with various aspects of this disclosure. The distribution 502 represents a hypothetical distribution of response times of work requests for the system 100 described above and is only presented here for illustrative purposes.

The illustrative distribution 502 plots each work request of a system according to the total response time of the work request. The horizontal axis represent the total response times 414 of the work requests. The vertical axis represents the number of work requests that had a particular total response time 414. As is shown in FIG. 5, most work requests have relatively short total response times 414 and are completed by the system 100 fairly quickly. However, some work requests have longer total response times 414 and may be termed outliers 504 of the distribution 502. Typically, the total response times 414 of the outlier 504 work requests is due to a number of error recovery operations being performed by the system 100. The more error recovery operations performed during a work request, the larger the amount of time between receipt of the work request (step 404) and completion of the work request (step 412). The outliers 504 account for most of the variation in total response times 414 of the work requests performed by the system 100.

Based on the distribution 502, an average of the total response times 414 for the system 100 may be determined. The average total response time may be characterized as a mean 506, a median 508, or a mode 510 of the distribution 502. In other embodiments, the average total response time may be characterized by another function or algorithm. As mentioned previously, frequently users of the system 100 or the storage device 205 desire to have consistent performance. To limit variations in total response times for executing work requests by the system 100, the performance monitor 130 is configured to assign additional computing resources to work requests that exceed an execution time threshold.

Figure 6:
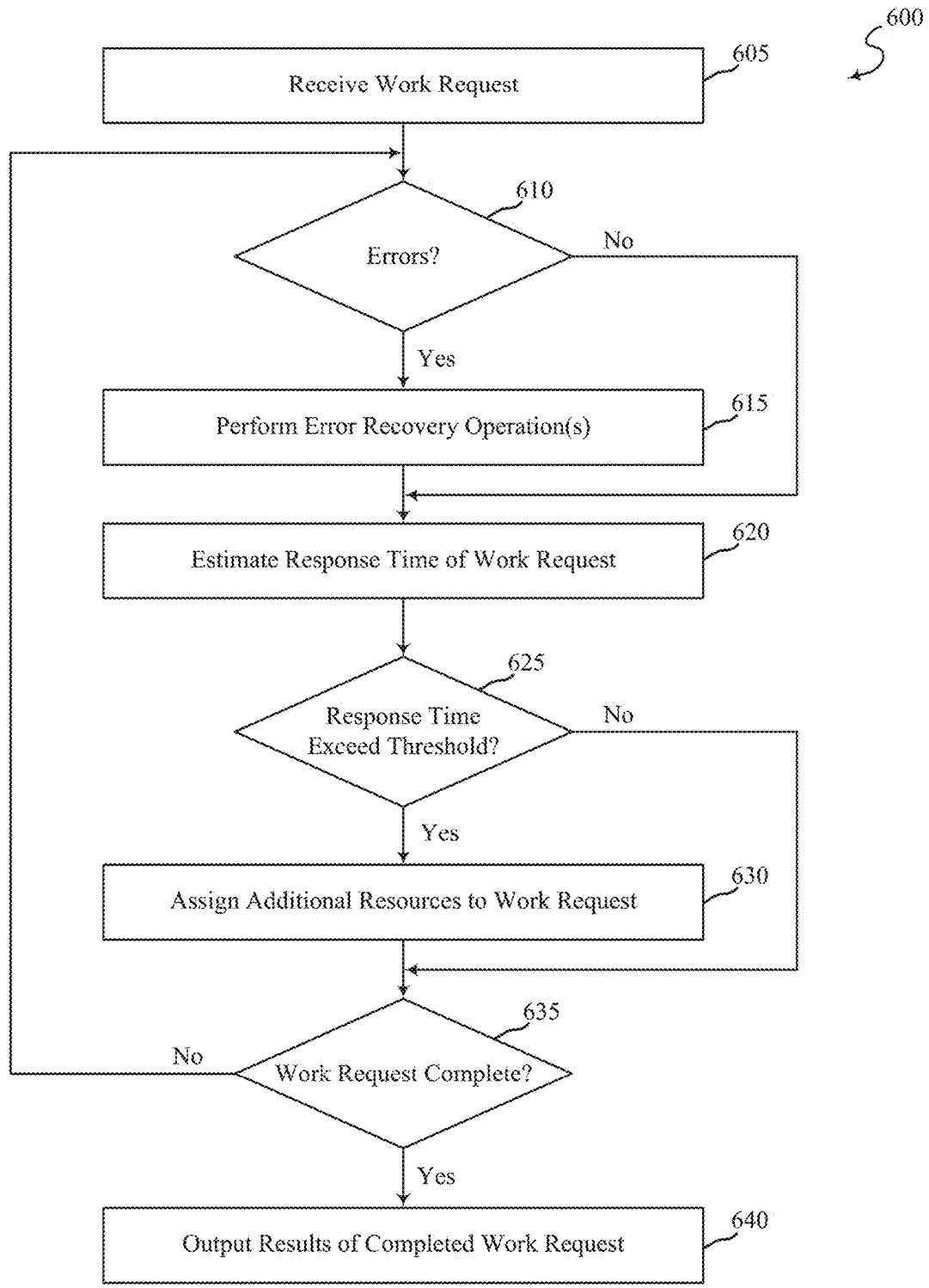
FIG. 6 shows a simplified flow chart illustrating an example of a method in accordance with various aspects of this disclosure.

FIG. 6 is a simplified flow chart illustrating an example of a method 600 for limiting performance variation in a storage device, in accordance with various aspects of the present disclosure. One or more aspects of the method 600 may be embodied as computerized programs, routines, and/or instructions that are executed by the computing systems (e.g., system 100 of FIG. 1, the storage device 205 of FIG. 2, and/or the performance monitor 130 depicted in FIGS. 1, 2 and 3). In some examples, a backend server, computing device, and/or storage device may execute one or more sets of codes to control the functional elements of the backend server, computing device, and/or storage device to perform one or more of the functions described below. Additionally or alternatively, the backend server, computing device, and/or storage device may perform one or more of the functions described below using special-purpose hardware.

At block 605, the system 100 may receive a work request from another computing device (e.g., a host computing device). The work request may include instructions to the system 100 to perform one or more operations. In some embodiments, the work request may include requests to perform a read operation from the system 100, a write operation to the system 100, other types of operations, or the work request may include a mixed work load of any type of operations.

Upon receiving a work request, the system 100 may be configured to determine an arrival time of the work request. The arrival time of each work request may be tracked as part of determining the response times and the total response times of the work requests. In some embodiments, work requests may be time-stamped with their arrival time. In other embodiments, the system 100 may maintain a log correlating work requests with an arrival time. In yet other embodiments, other methods of correlating work requests with their respective arrival times may be implemented by the system 100.

The system 100 may be configured to also mediate between multiple work requests vying for limited available computing resources. At times, the system 100 may receive more work requests than can be completed immediately. In such a situation, the system 100 may have to determine which work requests to execute and complete first and which work requests can wait till a later time to be executed and completed. For example, the system 100 may use a FIFO system to determine which work requests to complete first. In another example, the system 100 may use a priority system to determine which work requests to perform first. Such priority systems may determine priority based at least in part on the attributes of each work request, with certain types of work requests having higher priority than other types of work requests. Such priority systems may also be determined by another computing device (e.g., a host computing device) and sent to the system 100. In which case, the system 100 may execute the work requests in the priority dictated by the other computing device. In other embodiments, other types of work request priority systems may be implemented.

At block 610, the system 100 determines whether an error has occurred while executing one or more of the operation(s) included in a work request. During the execution of a work request, errors or failures will occur at some probability. For example, during a read operation, a charge present on a memory cell may be misinterpreted, causing the system 100 to "misread" the memory cell. In such an example, what was meant to be stored as a one, is instead interpreted as a zero. This will cause an error in the underlying data. The system 100 may be configured to execute a number of error detection algorithms to determine if an error occurs either in the underlying data that is the subject of the work request, or during the execution of the operation itself. Types of errors that may be detected may include errors induced by read disturbs (too many reads leak charge and shift the value), over program errors, and/or under program errors by not programming all of the nearby cells. Examples of error detection algorithms may include Bose-Chaudhuri-Hocquenghem Coding (BCH), low-density parity checks (LDPC), or any other type of appropriate error detection algorithm.

If no errors are detected at block 610, the system 100 moves to block 620 and goes to the next steps in the method 600. If one or more errors are detected, the system 100 moves to block 615 and executes one or more error recovery operations to compensate for an error that has been detected.

The specific error recovery operations implemented by the system 100 may depend on the type of error detected. In some embodiments, an error recovery operation may include re-reading one or more memory cells of the storage device and comparing the values to better determine what data value is the correct value. In other embodiments, the error recovery operation may include an outer code recovery operation, a voltage shift on the flash memory, another iteration of an iterative error corrective coding algorithm, or any other type of error corrective coding algorithm.

At block 620, the system 100 estimates a response time of the work requests being received by the system 100. The response time of a work request is indicative of a duration of time taken by the system 100 to partially execute the work request. The total response time of a work request is indicative of a duration of time taken by the system 100 to complete the work request. In some embodiments, estimating the response time of a particular work request may include comparing a current time to the arrival time of the particular work request and determining the response time based at least in part on the difference between the current time and the arrival time. In other embodiments, other estimation techniques may be used to determine the response times of work requests.

At block 625, the system 100 determines whether the response time exceeds an execution time threshold. This is done by comparing the response time against the execution time threshold. In some embodiments, the execution time threshold is equal to an average execution time to perform a work request. The average execution time may be determined based at least in part on historical data representing past total response times of completed work requests (e.g., the distribution 502 shown in FIG. 5). In some embodiments, the average execution time may be either the mean 506, the median 508, or the mode 510 of the distribution 502 represented in FIG. 5. In other embodiments, the average execution time may be determined using some other type of averaging algorithm. In yet other embodiments, the execution time threshold may not be based on an average of historical data but may instead be based at least in part on other algorithms or analysis of historical data. For example, the execution time threshold may be set based on a certain percentile of historical total response times. In yet other embodiments, the execution time threshold may be set and/or modified by a user through a user input. In yet other embodiments, the execution time threshold may be determined based on the capabilities of the hardware, firmware, or software of the system 100.

If the response time of a work request does not exceed the execution time threshold, the system 100 moves to block 635 of the method 600. If the response time of a work request exceeds the execution time threshold, the system 100 moves to block 630 of the method 600. At block 630, the system 100 assigns additional computing resources to complete a work request in an effort to reduce the total response time of the work request. In some situations, the longer response times may be due to handling too many work requests at one time. In such situations, the system 100 will assign additional computing resources to execute the work requests and put other processes on hold.

In some embodiments, the system 100 may assign additional resources to execute one or more error recovery operations being performed by the system 100. Frequently, longer total response times may be attributed to the performance of error recovery operations. In such situations, assigning additional computing resources may be enough to reduce the estimated total response time of the work request.

In some embodiments, assigning additional computing resources to various operations may include altering the computing priority of the various operations. For example, error recovery operations of a work request that has a response time that exceeds the execution time threshold may be given highest priority for computing resources. Consequently, the system 100 may use additional computing resources to complete the error recovery operations by putting other less prioritized operations on hold until the higher priority operations are completed. In some embodiments, one or more of blocks 620, 625, 630 of method 600 may be executed before blocks 610, 615 are executed. In some embodiments, the priority system for assigning additional computing resources to execute the error recovery operations is different than the priority system for managing the work requests described earlier.

At block 635, the system 100 determines whether the work request has been completed. If the work request has been completed, the system 100 moves to block 640 of the method 600. At block 640, the system 100 outputs the results of the completed work request to the originator of the work requests (e.g., a host computing device). If the work request has not been completed, the system 100 returns to block 610 and executes blocks 610, 615, 620, 625, 630, 635. In some embodiments, the system 100 at block 635 may determine a completion time of the work request. The system 100 may determine the total response time by taking the difference of the completion time and the arrival time.

The blocks of the method 600 may be performed using the performance monitor 130 described with reference to FIGS. 1-3 and/or other components. For example, the steps of method 600 may be implemented by any of the components described in FIG. 3. Thus, the method 600 may provide for limiting performance variation in a storage device. It should be noted that the method 600 is just one implementation and that the operations of the method 600 may be rearranged, omitted, and/or otherwise modified such that other implementations are possible and contemplated.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to storage system applications. In some embodiments, the concepts, the technical descriptions, the features, the methods, the ideas, and/or the descriptions may specifically apply to storage and/or data security system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software components that perform certain tasks. These software components may include script, batch, or other executable files that may be stored on a computer-readable storage medium or in a computing system. In some embodiments, these software components may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A storage device, comprising:
   a controller to:
   receive a request to perform one or more operations;
   detect at least one error associated with the request, the at least one error including an error in data being written to a storage medium of the storage device or an error in data being read from the storage medium;
   assign first resources to execute one or more error recovery operations to remedy the at least one error;
   execute the one or more error recovery operations using the first resources;
   estimate a response time of the request, the response time indicating a time period between receipt of the request and when the controller begins executing the request or a time period between beginning to execute the request and beginning to execute the one or more error recovery operations;
   determine that the response time exceeds an execution time threshold;
   assign second resources different from the first resources to the execution of the one or more error recovery operations upon determining that the response time exceeds the execution time threshold; and
   after assigning the second resources and before completing execution of the one or more error recovery operations, incorporate use of the second resources in the execution of the one or more error recovery operations while continuing to use the first resources.

2. The storage device of claim 1, the controller to:
   determine an arrival time of the request, the arrival time being a time at which the controller received the request.

3. The storage device of claim 2, the controller to:
   time-stamp the request with the arrival time.

4. The storage device of claim 2, the controller to:
   log the arrival time of the request in an arrival log.

5. The storage device of claim 2, the controller to:
   compare a current time to the arrival time; and
   determine the response time based on a difference between the current time and the arrival time.

6. The storage device of claim 1, the controller to:
   determine that an error has occurred during execution of the one or more operations included in the request; and
   execute the one or more error recovery operations to compensate for the error that has been detected.

7. The storage device of claim 1, wherein the one or more operations of the request include a mixed work load of both read operations and write operations.

8. The storage device of claim 1, wherein the execution time threshold is equal to an average execution time to perform the request.

9. The storage device of claim 1, the controller to:
   assign the one or more error recovery operations to have a highest priority.

10. The storage device of claim 1, wherein the storage device is a solid state drive (SSD) storage device.

11. The storage device of claim 1, wherein the one or more error recovery operations includes re-reading one or more memory cells of the storage device.

12. The storage device of claim 1, wherein the one or more error recovery operations includes an outer code recovery operation.

13. A method of limiting performance variation in a storage device, comprising:
   receiving, by a controller of the storage device, a request to perform one or more operations;
   detecting at least one error associated with the request, the at least one error including an error in data being written to a storage medium of the storage device or an error in data being read from the storage medium;
   assigning first resources to execute one or more error recovery operations to remedy the at least one error;
   executing the one or more error recovery operations using the first resources;
   estimating a response time of the request, the response time indicating a time period between receipt of the request and when the controller begins executing the request or a time period between beginning to execute the request and beginning to execute the one or more error recovery operations;

determining that the response time exceeds an execution time threshold;

assigning second resources different from the first resources to the execution of the one or more error recovery operations upon determining that the response time exceeds the execution time threshold; and after assigning the second resources and before completing execution of the one or more error recovery operations, incorporating use of the second resources in the execution of the one or more error recovery operations while continuing to use the first resources.

14. The method of claim 13, further comprising:
determining, by the controller, an arrival time of the request, the arrival time being a time at which the controller received the request.

15. The method of claim 14, wherein estimating the response time further comprises:
comparing a current time to the arrival time; and
determining the response time based on a difference between the current time and the arrival time.

16. The method of claim 13, further comprising:
determining that an error has occurred during execution of the one or more operations included in the request; and
executing the one or more error recovery operations to compensate for the error that has been detected.

17. The method of claim 13, wherein the execution time threshold is equal to an average execution time to perform the request.

18. The method of claim 13, wherein assigning the second resources to executing the one or more error recovery operations further comprises assigning the one or more error recovery operations to have a highest priority for resources of the storage device.

19. The method of claim 13, wherein the one or more error recovery operations includes re-reading one or more memory cells of the storage device.

20. A computing device configured for limiting performance variation in a storage device comprising a non-transitory computer-readable medium, the storage device comprising:

a processor;

memory in electronic communication with the processor, the memory stores computer executable instructions that when executed by the processor cause the processor to perform the steps of:

receiving, by a controller of the storage device, a request to perform one or more operations;

detecting at least one error associated with the request, the at least one error including an error in data being written to a storage medium of the storage device or an error in data being read from the storage medium;

assigning first resources to execute one or more error recovery operations to remedy the at least one error;

executing the one or more error recovery operations using the first resources;

estimating a response time of the request, the response time indicating a time period between receipt of the request and when the controller begins executing the request or a time period between beginning to execute the request and beginning to execute the one or more error recovery operations;

determining that the response time exceeds an execution time threshold;

assigning second resources different from the first resources to the execution of the one or more error recovery operations upon determining that the response time exceeds the execution time threshold; and after assigning the second resources and before completing execution of the one or more error recovery operations, incorporating use of the second resources in the execution of the one or more error recovery operations while continuing to use the first resources.

* * * * *